United States Patent
Deschaintre et al.

(10) Patent No.: US 12,266,039 B2
(45) Date of Patent: Apr. 1, 2025

(54) TARGET-AUGMENTED MATERIAL MAPS

(71) Applicant: Adobe Inc., San Jose, CA (US)

(72) Inventors: Valentin Deschaintre, London (GB); Yiwei Hu, New Haven, CT (US); Paul Guerrero, London (GB); Milos Hasan, San Jose, CA (US)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 17/985,579

(22) Filed: Nov. 11, 2022

(65) Prior Publication Data
US 2024/0161362 A1    May 16, 2024

(51) Int. Cl.
G06T 11/60    (2006.01)
G06T 3/40    (2024.01)
G06T 9/00    (2006.01)
G06V 10/74    (2022.01)

(52) U.S. Cl.
CPC ............... *G06T 11/60* (2013.01); *G06T 3/40* (2013.01); *G06T 9/00* (2013.01); *G06V 10/761* (2022.01)

(58) Field of Classification Search
CPC .. G06T 11/60; G06T 3/40; G06T 9/00; G06V 10/761
See application file for complete search history.

(56) References Cited

U.S. PATENT DOCUMENTS 10,424,087 B2 * 9/2019 Risser .................. G06T 11/00

FOREIGN PATENT DOCUMENTS

CN    112419334 A  *  2/2021

OTHER PUBLICATIONS

Eclat ("Materials in Virtual World", 2021, https://eclat-digital.com/materials-in-virtual-world/) (Year: 2021).*
Lipton, Zachary C., and Subarna Tripathi. "Precise recovery of latent vectors from generative adversarial networks (2017)." arXiv preprint arXiv:1702.04782 (2017) (Year: 2017).*
Zhang, Rui, et al. ("Style separation and synthesis via generative adversarial networks." Proceedings of the 26th ACM international conference on Multimedia. 2018) (Year: 2018).*
Arjovsky et al ("Wasserstein GAN", 2017) (Year: 2017).*

(Continued)

*Primary Examiner* — Xin Sheng
(74) *Attorney, Agent, or Firm* — Kilpatrick Townsend & Stockton LLP

(57) ABSTRACT

Certain aspects and features of this disclosure relate to rendering images using target-augmented material maps. In one example, a graphics imaging application is loaded with a scene and an input material map, as well as a file for a target image. A stored, material generation prior is accessed by the graphics imaging application. This prior, as an example, is based on a pre-trained, generative adversarial network (GAN). An input material appearance from the input material map is encoded to produce a projected latent vector. The value for the projected latent vector is optimized to produce the material map that is used to render the scene, producing a material map augmented by a realistic target material appearance.

20 Claims, 11 Drawing Sheets
(7 of 11 Drawing Sheet(s) Filed in Color)

(56) References Cited

OTHER PUBLICATIONS

Chen, Zhijia, Weixin Huang, and Ziniu Luo. "embedGAN: a method to embed images in GAN latent space." Proceedings of the 2020 DigitalFutures: The 2nd International Conference on Computational Design and Robotic Fabrication (CDRF 2020). Springer Singapore, 2021. (Year: 2020).*

Zhou Xilong, et al., TileGen: Tileable, Controllable Material Generation and Capture, in SIGGRAPH Asia 2022 Conference Papers (SA '22 Conference Papers), Daegu, Republic of Korea. ACM, New York, NY, USA, Dec. 6-9, 2022, 8 pages.

An et al., AppProp: All-Pairs Appearance-space Edit Propagation, Association for Computing Machinery Transactions on Graphics, vol. 27, No. 3, Aug. 1, 2008, pp. 40:1-40:9.

Ben-Artzi et al., A Precomputed Polynomial Representation for Interactive BRDF Editing with Global Illumination, Association for Computing Machinery Transactions on Graphics, vol. 27, No. 2, Apr. 2008, pp. 13:1-13:13.

Ben-Artzi et al., Real-time BRDF Editing in Complex Lighting, Available online at: https://cseweb.ucsd.edu/~ravir/brdfediting-final.pdf, Jul. 1, 2006, 10 pages.

Cook et al., A Reflectance Model for Computer Graphics, Association for Computing Machinery Transactions on Graphics, vol. 1, No. 1, Jan. 1, 1982, pp. 7-24.

Cramer, On the Composition of Elementary Errors, Scandinavian Actuarial Journal, Second Paper: Statistical Applications, vol. 1928, No. 1, Dec. 22, 2011, pp. 141-180, Abstract, pp. 1-7.

Deschaintre et al., Flexible SVBRDF Capture with a Multi-Image Deep Network, Computer Graphics Forum (Proceedings of the Eurographics Symposium on Rendering), vol. 38, No. 4, Jun. 27, 2019, 13 pages.

Deschaintre et al., Guided Fine-Tuning for Large-Scale Material Transfer, Computer Graphics Forum (Proceedings of the Eurographics Symposium on Rendering), vol. 39, No. 4, Jul. 8, 2020, pp. 91-105.

Deschaintre et al., Single-Image SVBRDF Capture with a Rendering-Aware Deep Network, Association for Computing Machinery Transactions on Graphics, vol. 37, No. 4, Aug. 2018, pp. 128:1-128:15.

Fiser et al., Illumination-Guided Example-Based Stylization of 3D Renderings, Association for Computing Machinery Transactions on Graphics, vol. 35, No. 4, Jul. 24-28, 2016, pp. 1-11.

Gao et al., Deep Inverse Rendering for High-resolution SVBRDF Estimation from an Arbitrary Number of Images, Association for Computing Machinery Transactions on Graphics, vol. 38, No. 4, Jul. 12, 2019, pp. 134:1-134:15.

Gatys et al., Controlling Perceptual Factors in Neural Style Transfer, Proceedings of the Institute of Electrical and Electronics Engineers Conference on Computer Vision and Pattern Recognition, May 11, 2017, 9 pages.

Gatys et al., Image Style Transfer Using Convolutional Neural Networks, In Proceedings of the Institute of Electrical and Electronics Engineers Conference on Computer Vision and Pattern Recognition, Jun. 2016, pp. 2414-2423.

Gatys et al., Texture Synthesis Using Convolutional Neural Networks, In Advances in Neural Information Processing Systems, May 27, 2015, 9 pages.

Gryaditskaya et al., Gloss Editing in Light Fields, Proceedings of the Conference on Vision, Modeling and Visualization, Eurographics Association, Oct. 10, 2016, 9 pages.

Guarnera et al., BRDF Representation and Acquisition, Computer Graphics Forum, vol. 35, No. 2, May 27, 2016, 27 pages.

Guo et al., A Bayesian Inference Framework for Procedural Material Parameter Estimation, Computer Graphics Forum, vol. 39, No. 7, Nov. 4, 2020, 12 pages.

Guo et al., Highlight-aware Two-Stream Network for Single-Image SVBRDF Acquisition, Association for Computing Machinery Transactions on Graphics, vol. 40, No. 4, Aug. 2021, pp. 123:1-123:14.

Guo et al., MaterialGAN: Reflectance Capture using a Generative SVBRDF Model, Computer Vision and Pattern Recognition, vol. 39, No. 6, Available online at: https://arxiv.org/pdf/2010.00114.pdf, Dec. 2020, pp. 254:1-254:13.

Heitz et al., A Sliced Wasserstein Loss for Neural Texture Synthesis, Institute of Electrical and Electronics Engineers/CVF Conference on Computer Vision and Pattern Recognition (CVPR), Mar. 11, 2021, 9 pages.

Henzler et al., Generative Modelling of BRDF Textures from Flash Images, Association for Computing Machinery Transactions on Graphics, vol. 40, No. 6, Dec. 2021, pp. 284:1-284:13.

Hu et al., A Deep Representation for Manipulating Measured BRDF, Computer Graphics Forum, vol. 39, No. 2, Jul. 13, 2020, 48 pages.

Hu et al., A Novel Framework for Inverse Procedural Texture Modeling, Association for Computing Machinery Transactions on Graphics, vol. 38, No. 6, Nov. 2019, pp. 186:1-186:14.

Hu et al., An Inverse Procedural Modeling Pipeline for SVBRDF Maps, Association for Computing Machinery Transactions on Graphics, vol. 41, No. 2, Jan. 4, 2022, pp. 18:1-18:17.

Huang et al., Arbitrary Style Transfer in Realtime with Adaptive Instance Normalization, Proceedings of the Institute of Electrical and Electronics Engineers International Conference on Computer Vision, Jul. 30, 2017, 11 pages.

Huang et al., Style Mixer: Semanticaware Multi-Style Transfer Network, Computer Graphics Forum, vol. 38, No. 7, Oct. 29, 2019, 13 pages.

Jamriska et al., Stylizing Video by Example, Association for Computing Machinery Transactions on Graphics, vol. 38, No. 4, Jul. 2019, pp. 107:2-107:11.

Johnson et al., Perceptual Losses for Real-Time Style Transfer and Super-Resolution, European Conference on Computer Vision, Oct. 2016, pp. 1-18.

Karras et al., Alias-Free Generative Adversarial Networks, Available online at: https://arxiv.org/pdf/2106.12423.pdf, Oct. 18, 2021, 31 pages.

Karras et al., Analyzing and Improving the Image Quality of StyleGAN, Proceedings of the IEEE/CVF Conference on Computer Vision and Pattern Recognition, Jun. 14, 2020, pp. 8110-8119.

Karras et al., Training Generative Adversarial Networks with Limited Fata, Advances in Neural Information Processing Systems, vol. 33, Dec. 6, 2020, pp. 1-11.

Kolkin et al., Style Transfer by Relaxed Optimal Transport and Self-Similarity, Proceedings of the IEEE/CVF Conference on Computer Vision and Pattern Recognition (CVPR), Oct. 9, 2019, 12 pages.

Lawrence et al., Inverse Shade Trees for Non-Parametric Material Representation and Editing, ACM Transactions on Graphics, vol. 25, No. 3, Jul. 1, 2006, pp. 735-745.

Lepage et al., Material Matting, ACM Transactions on Graphics, vol. 30, No. 6, Dec. 12, 2011, pp. 144:1-144:10.

Li et al., Modeling Surface Appearance from a Single Photograph using Self-augmented Convolutional Neural Networks, ACM Transactions on Graphics, vol. 36, No. 4, Sep. 4, 2018, pp. 45:1-45:11.

Mazlov et al., Neural Appearance Synthesis and Transfer, Workshop on Material Appearance Modeling, Klein R., Rushmeier H., (Eds.), The Eurographics, 2019, pp. 35-39.

Ngan et al., Image-driven Navigation of Analytical BRDF Models, Proceedings of the 17th Eurographics Conference on Rendering Techniques, Jun. 26, 2006, 10 pages.

Nguyen et al., 3D Material Style Transfer, Computer Graphics Forum, vol. 31, No. 2, 2012, 8 pages.

Phong, Illumination for Computer Generated Pictures, Communications of the ACM, vol. 18, No. 6, Jun. 1, 1975, pp. 311-317.

Rodriguez-Pardo et al., Neural Photometry-Guided Visual Attribute Transfer, IEEE Transactions on Visualization and Computer Graphics, vol. 29, No. 3, Dec. 5, 2021, 13 pages.

Serrano et al., An Intuitive Control Space for Material Appearance, ACM Transactions on Graphics, vol. 35, No. 6, Jun. 13, 2018, 12 pages.

Shi et al., A Low-Dimensional Perceptual Space for Intuitive BRDF Editing, EGSR 2021—Eurographics Symposium on Rendering—DL-only Track, Jun. 2021, 13 pages.

(56) References Cited

OTHER PUBLICATIONS

Shi et al., MATch: Differentiable Material Graphs for Procedural Material Capture, Association for Computing Machinery Transactions on Graphics, vol. 39, No. 6, Dec. 2020, pp. 1-15.

Simonyan et al., Very Deep Convolutional Networks for Large-Scale Image Recognition, In International Conference on Learning Representations, Available online at: https://arxiv.org/abs/1409.1556, Apr. 10, 2015, 14 pages.

Sykora et al., StyleBlit: Fast Example-Based Stylization with Local Guidance, Computer Graphics Forum, vol. 38, No. 2, Jul. 9, 2018, pp. 1-9.

Talton et al., Exploratory Modeling with Collaborative Design Spaces, ACM Transactions on Graphics, vol. 28, No. 5, Dec. 1, 2009, 10 pages.

Texler et al., Arbitrary Style Transfer Using Neurally-guided Patch-based Synthesis, Computers & Graphics, Apr. 1, 2020, 11 pages.

Texler et al., FaceBlit: Instant Real-time Example-based Style Transfer to Facial Videos, Proceedings of the ACM on Computer Graphics and Interactive Techniques, vol. 4, No. 1, May 2021, pp. 14:1-14:17.

Texler et al., Interactive Video Stylization Using Few-Shot Patch-Based Training, ACM Transactions on Graphics, vol. 39, No. 4, Apr. 29, 2020, 11 pages.

Ulyanov et al., Deep Image Prior, In Proceedings of the IEEE Conference on Computer Vision and Pattern Recognition, May 17, 2020, 23 pages.

Ulyanov et al., Texture Networks: Feed-Forward Synthesis of Textures and Stylized Images, In International Conference on Machine Learning (ICML), Mar. 10, 2016, 9 pages.

Walter et al., Microfacet Models for Refraction through Rough Surfaces, Proceedings of the 18th Eurographics Conference on Rendering Techniques, Eurographics Association, 2007, 13 pages.

Wills et al., Toward a Perceptual Space for Gloss, ACM Transactions on Graphics, vol. 28, No. 4, Available online at: https://dl.acm.org/doi/pdf/10.1145/1559755.1559760, Sep. 2009, 15 pages.

Ye et al., Deep Reflectance Scanning: Recovering Spatially-Varying Material Appearance from a Flash-lit Video Sequence, Computer Graphics Forum, vol. 40, 2021, pp. 1-18.

Zhou et al., Adversarial Single-Image SVBRDF Estimation with Hybrid Training, Computer Graphics Forum, vol. 40, No. 2, 2021, pp. 315-325.

Zhou et al., Non-Stationary Texture Synthesis by Adversarial Expansion, ACM Transactions on Graphics, vol. 37, No. 4, May 11, 2018, 13 pages.

Zsolnai-Fehŕ et al., Photorealistic Material Editing Through Direct Image Manipulation, Computer Graphics Forum, Sep. 12, 2019, 14 pages.

\* cited by examiner

US 12,266,039 B2

TARGET-AUGMENTED MATERIAL MAPS

TECHNICAL FIELD

The present disclosure generally relates to graphical image editing. More specifically, but not by way of limitation, the present disclosure relates to programmatic techniques for transferring textures present in existing photographs or drawings to material maps used in rendering a graphical image to provide realistic looking materials in the rendered image.

BACKGROUND

Graphics design software applications are used for a number of different functions connected to manipulating or editing digital images. For example, such software applications may be used to create and render images of vivid virtual environments using either photographs or graphically designed images as a starting point. Materials within an image of such an environment make up the various visual elements. As examples, a brick wall is made up of "brick material," and grass is made up of "grass material." Such materials may be represented mathematically for storage and digital processing as texture maps where each pixel is specified by a spatially varying parameter of a model of the real-world material that is to be represented. Such texture maps can be edited by a user of the graphics design software application applying artistic expertise using tools designed for image editing.

SUMMARY

Certain aspects and features of the present disclosure relate to rendering images using target-augmented material maps. For example, a method involves accessing a scene, a target image including a target material appearance, an input material map, and a material generation prior. The material generation prior is based on a pre-trained, generative adversarial network (GAN). The method also involves encoding, based on the material generation prior and using the pre-trained GAN, an input material appearance from the input material map to produce a projected latent vector. The method further involves optimizing a current value for the projected latent vector based on the material generation prior to minimize a statistical difference between the target image and a renderable image corresponding to the current value of the projected latent vector. The method may additionally involve rendering or storing the scene based on an optimized, final value of the projected latent vector and based on an output material map augmented by the target material appearance.

Other embodiments include corresponding computer systems, apparatus, and computer programs recorded on one or more computer storage devices, each configured to perform the actions of a method.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Features, embodiments, and advantages of the present disclosure are better understood when the following Detailed Description is read with reference to the accompanying drawings, where.

DETAILED DESCRIPTION

Figure 1:
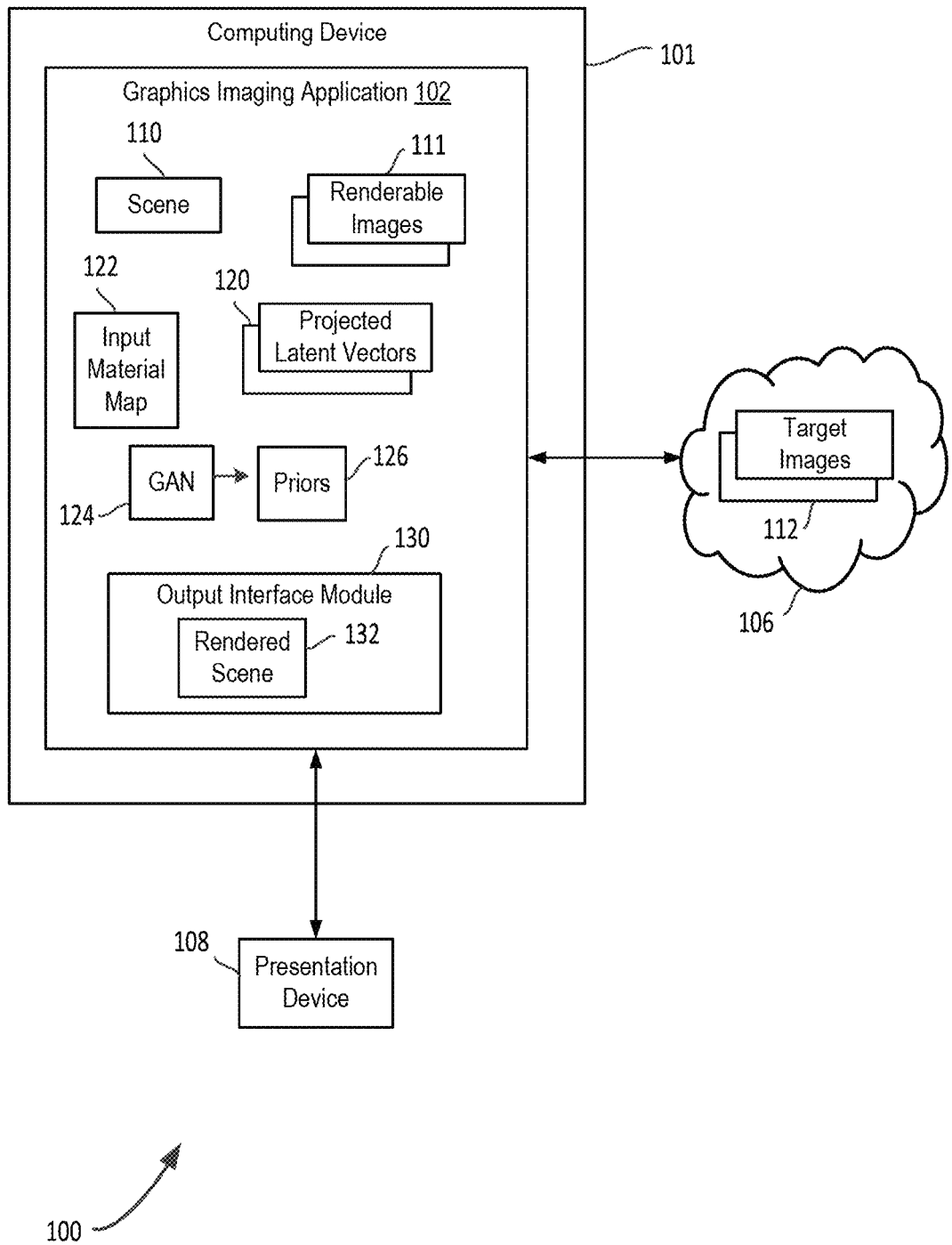
FIG. 1 is a diagram showing an example of a computing environment for using target-augmented material maps according to certain embodiments.

Realistic-looking materials can be an important component of a virtual environment. The materials within an image of such an environment make up various visual elements. Such materials may be represented mathematically for storage and digital processing as texture maps. Two-dimensional texture map representations are ubiquitous due to the compactness of the models on which the maps are based, and the computational ease of rendering images based on such representations.

Two-dimensional texture maps can be difficult to edit without applying significant artistic expertise, since many of the tools available to edit such maps are designed for photography rather than for graphical images. Propagating edits throughout a material can make editing easier, but such edits only produce realistic results for spatially constant materials. Procedural modeling techniques can also be used, but also lack realism if significant time and effort is not spent developing a realistic model for the task at hand.

Embodiments described herein address the above issues by automatically adjusting the appearance of a scene rendered using material maps, wherein adjusted textures in the scene are based on textures in preexisting photographs or digital images ("target" images). The textures in the target images serve as mathematical programmatic examples for rendering textures in scenes. The concept of texture in this context may alternatively or additionally include color and/or shading, as well as the small contours more generally defined as texture. Large scale structures from the original material map of the scene (the "input" material map) to which the desired texture is applied are preserved, and the entire process is automatically controlled to remain within the realm of visually plausible materials so that a scene rendered with the target material appearance appears realistic and exhibits a high degree of visual saliency.

The augmentation of existing material maps based on input photos as described herein can be useful with procedural materials, which can be difficult to design realistically. Such a process can be applied to minimize the gap between an unrealistic procedural material and a realistic photo, which can serve as a complementary process in inverse procedural material modeling systems. Examples in this disclosure ensure tileability after optimization, so that the transferred material maps can be directly applied to render textures in virtual scenes smoothly. Given photographs as examples, realistic details can be transferred onto simple-looking materials. An entire scene can be textured and rendered seamlessly.

For example, a graphics imaging application is loaded with one or more files for a scene and an input material map, as well as a file for a target image. A stored, material generation prior is accessed by the graphics imaging application. This prior, as an example, is acquired from a pre-trained, generative adversarial network (GAN). An input material appearance from the input material map is encoded by the graphics imaging application using the prior and the GAN to produce a projected latent vector. The value for the latent vector is optimized by minimizing the statistical difference between the target image and a stored, renderable image that, for each iteration, corresponds to an intermediate material map that is based on each projected value of the latent vector. Once optimized, the intermediate material map becomes the output material map; the material map that is used to render the scene. The output material map is augmented by a realistic target material appearance.

In some examples, the graphics imaging application uses one or more loss functions including a style loss and a feature description loss for optimizing the latent vector. The style loss can be defined using sliced Wasserstein loss. The feature description loss can be based on feature descriptions obtained using a pre-trained VGG network. Multiple target images can be used to augment an output material map by using a uniform number of samples across target images.

The use of the target image(s) and the pre-trained GAN guide the optimization process to bound the material eventually rendered to maintain visual plausibility while being close to the target image material appearance. The rendered material realistically follows the large-scale structures that were defined by the input material map. The final scene can be rendered quickly with little or no manual control of the process.

FIG. 1 is a diagram showing an example of a computing environment for using target-augmented material maps according to certain embodiments. The computing environment 100 includes a computing device 101 that executes a graphics imaging application 102, a memory device 106 configured to store target images 112, and a presentation device 108 that is controlled based on the graphics imaging application 102. In this example, the image graphics imaging application 102 includes generative adversarial network (GAN) 124, which can be used to generate priors 126. In some examples, a prior and the GAN are used to encode an input material appearance from an input material map 122 to produce a projected latent vector 120. The input material map 122 may correspond to an input scene 110. Input scene 110 may include one or more materials that are defined by one or more of the input material maps 122. The value of the projected latent vector 120 is optimized, producing multiple vectors over time. A renderable image 111 is produced for each projected latent vector. The optimization process minimizes the statistical difference between the target image with the texture to be applied and the corresponding renderable image. The final, optimized value of the projected latent vector can be used to produce an output material map augmented by the material appearance from the target image.

In the example of FIG. 1, the graphics imaging application 102 also includes an output interface module 130. In some embodiments, the graphics imaging application 102 uses inputs (not shown) related to accessing a scene 110 for having materials applied. The target images 112 serve as examples to augment materials in the scene to control the graphics imaging application 102. The graphics imaging application 102 may provide prompts or menus to the output interface module for display at a presentation device 108, which can be a local presentation device or a computing device that is remotely accessible over a data network.

The graphics imaging application includes one or more software modules, for example, a rendering module (not shown) that renders images, such as rendered scene 132 for display in the output interface module 130. Examples of applications that may be used as a graphics imaging application include those for use in the creation, modification, or rendering of images. Such applications may operate as standalone applications or may be integrated with in a suite of tools, or be integrated with a general-purpose image editing application, such as one used for document design, Web design, photographic editing, video editing, etc.

Figure 2:
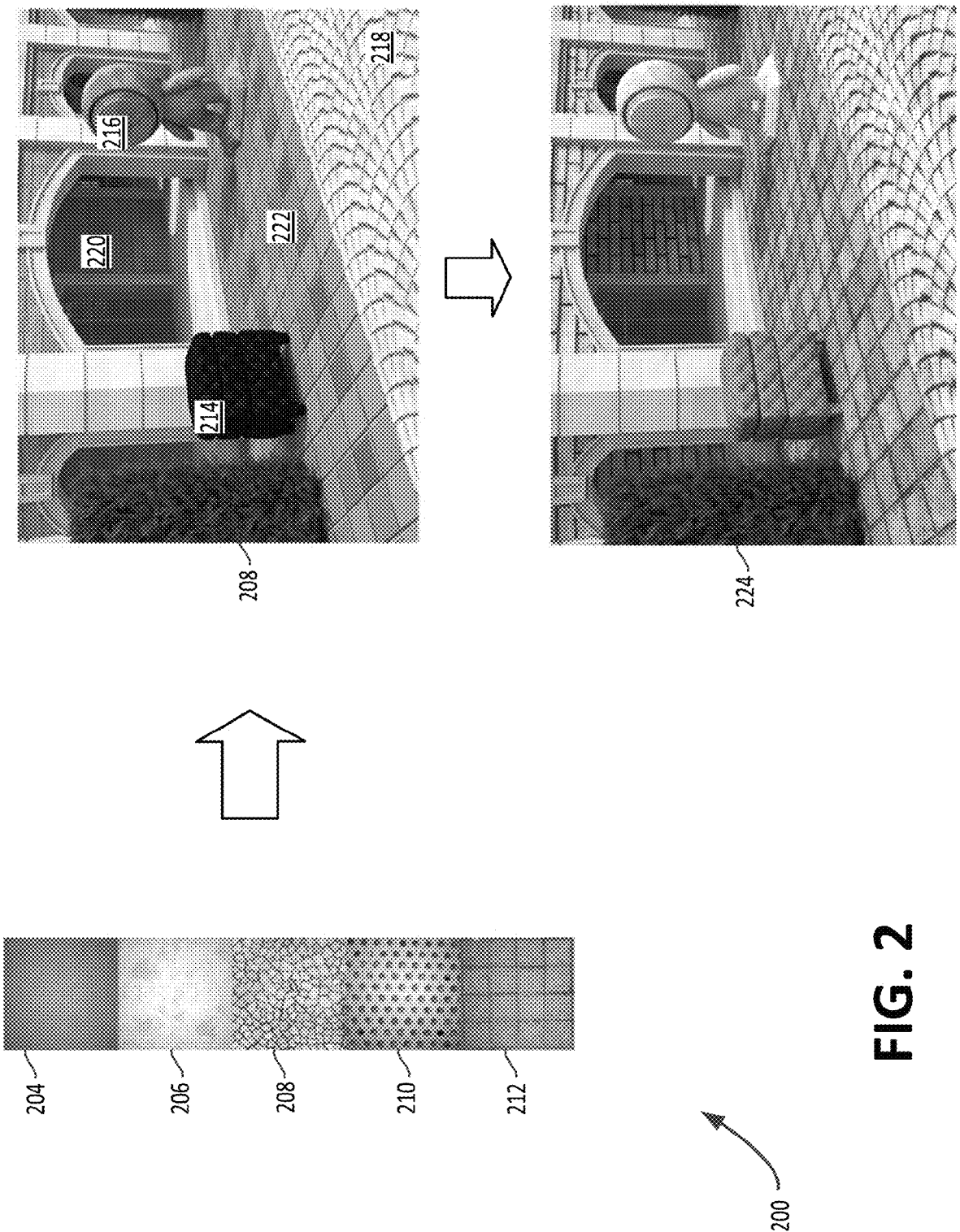
FIG. 2 is an example of corresponding input and output versions of a scene and of target material images used to augment materials in the scene, according to certain embodiments.

FIG. 2 is an example 200 of corresponding input and output versions of a scene and of target material images used to augment materials in the scene. Features and aspects of this disclosure include controlling and improving the appearance of existing material such as those in input scene 202 by transferring the appearance of materials in one or more target images, photos in this example, such as target images 204-212, to the existing materials in scene 202. The material from target image 204 is transferred to the basket 214. The material from target image 206 is transferred to the character 216. The material from target image 208 is transferred to the road 218. The material from target image 210 is transferred to the wall 220, and the material from target image 212 is transferred to the walkway 222. The augmented material is shown in rendered scene 224 and combines the coarse structure from the original material with the fine-scale appearance of the target images 204-212, while preserving input tileability. Color and/or shading can also be transferred.

An appearance can be transferred from materials using different types of spatial control. For example, material appearance can be transferred using precise, user-specified regions. Additional control can be provided by using multiple target images, as will be discussed in detail below with reference to FIG. 4. The process can be used to make existing materials more realistic using readily available images or photos.

Figure 3:
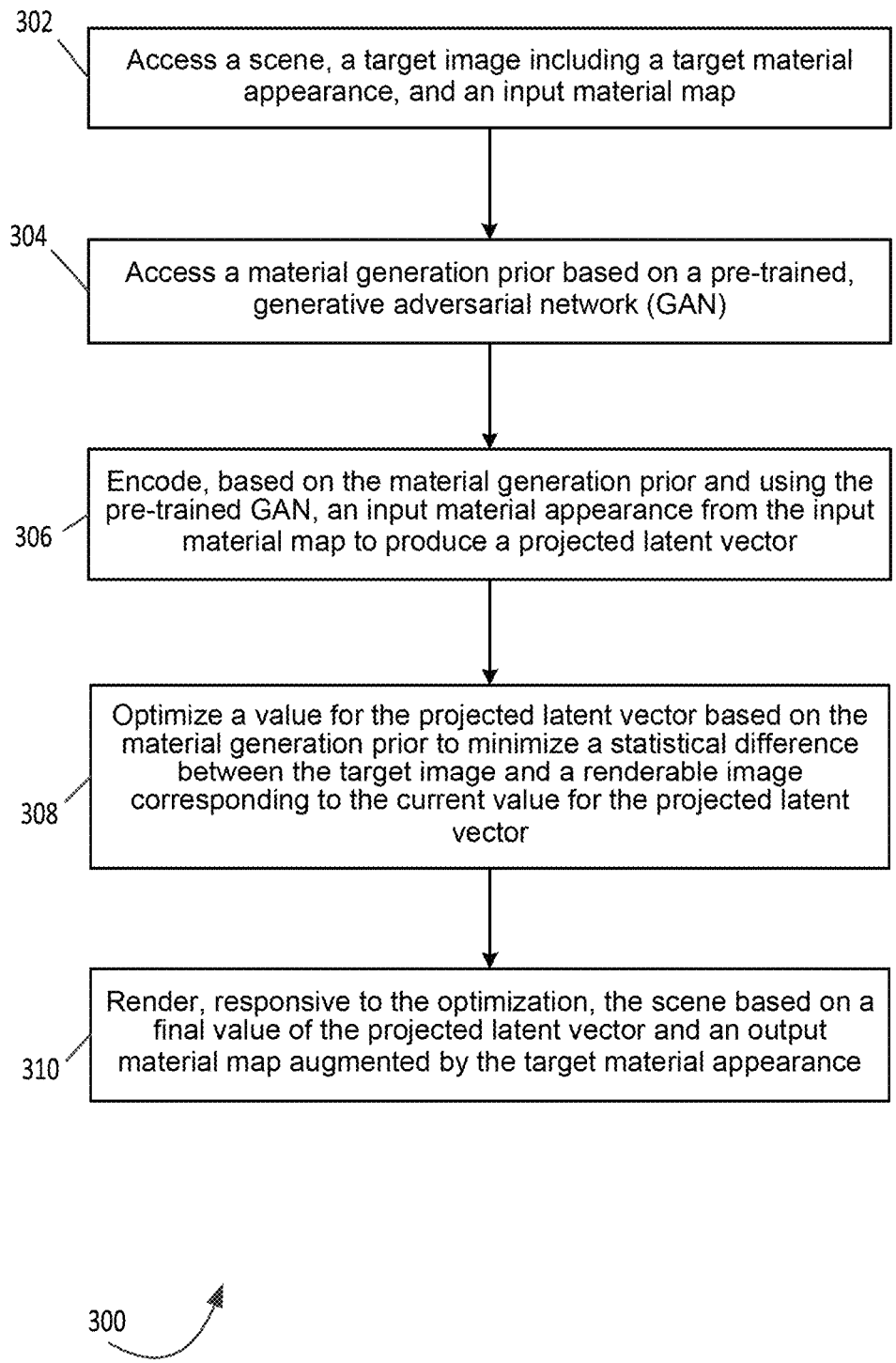
FIG. 3 is a flowchart of an example of a process using target-augmented material maps according to some embodiments.

FIG. 3 is a flowchart of an example of a process 300 for using target-augmented material maps. In this example, a computing device carries out the process by executing suitable program code, for example, computer program code executable to provide a graphics imaging application such as graphics imaging application 102. At block 302, the computing device accesses a scene, a target image, and an input material map that corresponds to the seeing. The target image includes at least one target material appearance. At block 304, the computing device accesses a material generation prior based on a pre-trained, generative adversarial network (GAN). The prior is a statistical function generated by the GAN. To produce the prior, the GAN is trained with a large dataset of synthetic material maps so that the transfer process is bounded by the range of "prior" material maps in order to produce realistic results.

In one example, the GAN used is a MaterialGAN, which is produced by modifying a StyleGAN architecture to ensure tileability based on the synthesized material maps used for training, even if the training data itself is not tileable. A MaterialGAN is a deep generative convolutional network that is trained to synthesize certain kinds of realistic parameter maps. The StyleGAN is an extension to the GAN architecture that proposes large changes to the generator model, including the use of a mapping network to map points in latent space to an intermediate latent space, the use of the intermediate latent space to control style at each point in the generator model, and the introduction of noise as a source of variation at each point in the generator model.

Mapped textures are considered "tileable" when a large, mapped area can be efficiently subdivided into smaller tiles to optimize storage, for example, when a repeating pattern is present. Specifically, in this example, to maintain tileability, the network can be prevented from processing image borders differently than the rest of the image, by modifying all convolutional and upsampling operations with circular padding. Once the generator network has been modified to always produce tileable outputs, the network cannot be exposed to tileable synthesized and non-tileable real data as the discriminator would differentiate the two, which would be undesirable. In order to avoid this exposure, real and synthesized material maps are cropped. The discriminator layer of the network thus cannot identify whether the crop comes from a tileable source or not, and instead will identify whether the crop content looks like real or fake material.

At block 306 of process 300, the computing device encodes an input material appearance from the input material map for the scene to produce a projected latent vector. The encoding is based on the material generation prior. By taking material that has been provided by the original scene's material map and encoding it into a generational model while using materials generated from the target image as a guide, plausibility with respect to the original scene is maintained. This technique achieves better results than overfitting, or otherwise trying to match materials in a simplistic way. For example, lighting artifacts such as those caused by a camera flash used in capturing a target image are ignored. The applied material in the final scene looks like that from the target image, but naturally fits in the final image, because the modeling can make singular assumptions to determine what features of a target image are relevant and what features are not.

Computationally, using the input material map as described above also makes it possible to use the target image material appearance in the output material map in the rendering pipeline. Given a set of input material maps $M_0$ and a user-provided target image I, the transferred material maps M can be computing as follows:

$$\operatorname*{argmin}_{M} d_0(R(M), I) + d_1(M, M_0), \tag{1}$$

where R is a differentiable rendering operator, rendering material maps M into an image. $d_1(M, M_0)$ measures the statistical similarity between the synthetic image R(M) and target image I. $d_1(M, M_0)$ is a regularization term that penalizes the structure difference between transferred material maps M and the original input $M_0$.

In this example, a statistics-based process is used to measure the similarity for $d_0$ and $d_1$. Using per-pixel optimization on material maps M with $d_0$ and $d_1$ set as style loss and feature loss, firstly, fails to capture a realistic appearance of the target image. This failure results from challenging local minima in the optimization and a high sensitivity to the learning rate, requiring careful tuning. And secondly, the optimization with these losses may result in departure from the manifold of realistic materials. As an alternative, an aspect of the process described herein takes advantage of the learned latent space of the pre-trained, tileable MaterialGAN to regularize the material transfer and address these problems.

Continuing with FIG. 3, at block 308, the computing device optimizes a value for the projected latent vector. The value is determined based on the prior in order to minimize a statistical difference between the target image and a renderable image corresponding to the current value for the vector. In this example, optimization for the material transfer is handled in two stages. First, the input material maps $M_0$ are projected into the latent space of the pre-trained MaterialGAN model f by optimizing the latent code $\theta$. The optimization is guided by $L_1$ loss and the feature description loss:

$$L_\theta = \|f(\theta) - M_0\|_1 + \|F(f(\theta)) - F(M_0)\|_1 \tag{2},$$

where F is a feature extractor that uses a pre-trained VGG network. Secondly, with the projected latent vector, the material transfer is performed by optimizing $\theta$ to minimize the statistical difference between material $R(f(\theta))$ in a renderable image and the material I in the target image:

$$L_\theta = \|S(R(f(\theta))) - S(I)\|_1 + \|F(f(\theta)) - F(M_0)\|_1 \tag{3},$$

At block 310, in response to the optimization, the scene is rendered or stored based on the final, optimized value of the projected latent vector. For example, rendered scene 132 may be rendered to the presentation device 108 in FIG. 1. Alternatively, the rendered scene may be stored for additional processing or future use, either in memory device 106 or in a memory component within computing device 101. The material map for the rendered scene is augmented by the target material appearance, and this material map can also be stored for further processing or future use.

Figure 4:
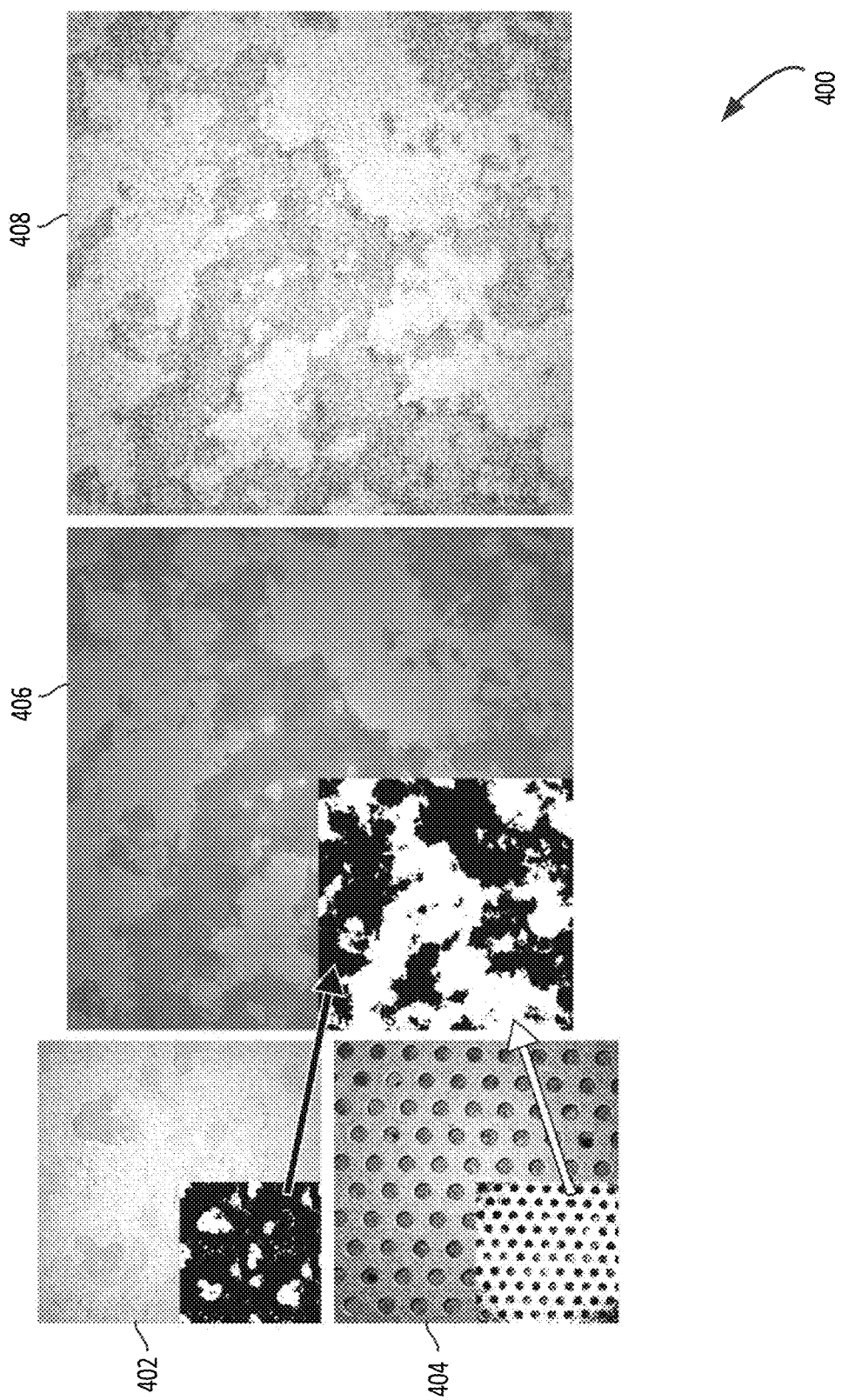
FIG. 4 is an example of using target images to augment input material, according to certain embodiments.

More control over the final material in a scene can be provided by using more than one target image. A sliced Wasserstein loss can be used to compare two target images by projecting per pixel VGG network features onto randomly sampled directions in feature space, giving two sets of one-dimensional sample points u and v, one for each target image. These sample points are compared by taking the difference between the sorted sample points. To allow for different sample counts, for example, |u|<|v|, the resampled sliced Wasserstein loss can be introduced as:

$$L_{SW1D}(u, v) = \frac{1}{|u|}\|\text{sort}(u) - \text{sort}(U(v))\|_1, \quad (4)$$

where U(v) is an operator that uniformly random subsamples a vector to obtain |u| samples from v. Note here the $L_1$ error as opposed to squared error is computed as the $L_1$ error produces better results. Using this resampling approach, statistical differences between labeled regions of different sizes can be computed. Assuming label maps associated with the material maps and each target image can be obtained, the transfer rule can be defined as Label X: Target Y, Z, meaning a material appearance from regions labeled by Z in target photo Y is transferred onto regions labeled by X in the input material maps. FIG. 4 is an example 400 of using multiple target images to augment input material as described above, according to certain embodiments.

For the multi-target transfer shown in FIG. 4, the appearance of two target images, target image 402 and target image 404 is transferred to the same input material 406. A binary map of the input material defines which of the two targets can be used for each pixel. Additionally, a binary map can be defined for each target to determine which regions should be included in the appearance transfer. Using precise, user-specified regions for the transfer of an example provides a user with greater control over the appearance of the final scene. In this example, the appearance is transferred from the black region of the mask of target image 402 to the black regions on the input mask. The white regions of target image 404 are similarly transferred. The resulting output material map results in output material 408 being rendered in the relevant scene. This choice between two regions is shown here only to provide clear visualization to the reader. There is no limit to the number of correspondences that can be made following this example.

Figure 5:
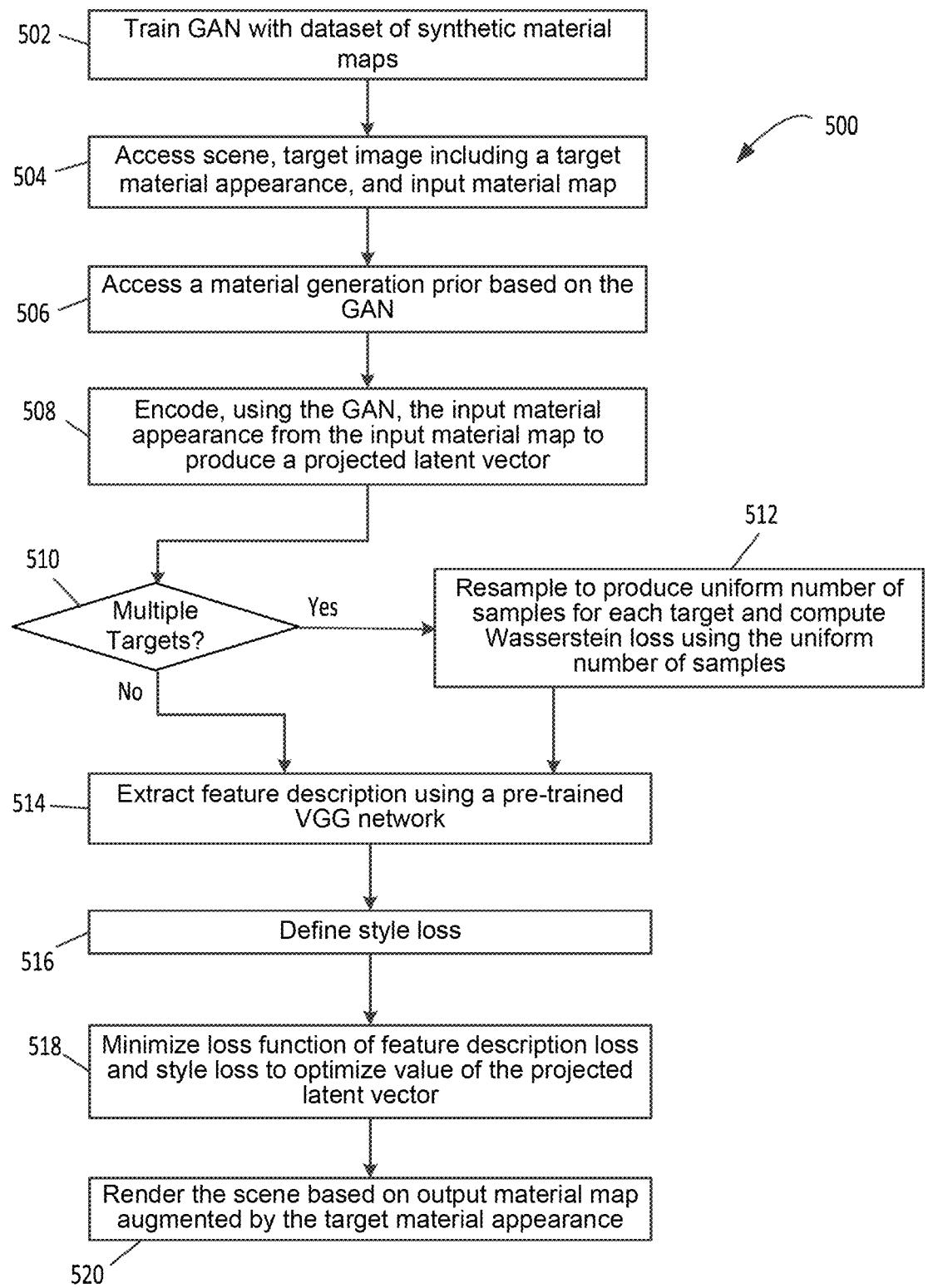
FIG. 5 is a flowchart of another example of a process using target-augmented material maps according to some embodiments.

FIG. 5 is a flowchart of another example of a process 500 using target-augmented material maps according to some embodiments. In this example, a computing device carries out the process by executing suitable program code, for example, computer program code for an application, such as graphics imaging application 102. At block 502, the computing device trains the GAN with the dataset of synthetic material maps. The GAN can be trained with loss functions including cross-entropy loss with R1 regularization and path regularization loss for the generators. Further details are described below with respect to FIG. 6. With the tileable material prior that can be produced with the trained MaterialGAN, the material transfer process described herein overcomes the local minimum problems caused by simple per-pixel optimization and reconstructs high-quality material maps as compared to those reconstructed with an adaption of a deep image prior.

The modified network of the MaterialGAN as described herein can successfully preserve tileability after transfer compared to an unmodified MaterialGAN. The preserved tileability allows for direct application of transfer materials onto different objects seamlessly in a large-scale scene as shown in the example of FIG. 2. The trained model can work as a regularization, which causes the process to stay in the space of plausible materials. The model can prevent the material transfer from resulting in a texture with features that appear unnatural, or really different from the desired material.

At block 504 of process 500, the computing device accesses a scene, a target image, and an input material map that corresponds to the scene, as described with respect to block 302 of FIG. 3. At block 506, the computing device accesses the material generation prior as previously discussed with respect to block 304 of FIG. 3. At block 508, the computing device encodes an input material appearance from the input material map for the scene to produce a projected latent vector. The projection of the latent vector can be seen as a projection into some space of materials, for example, a set of possible materials that can be conceptualized as a distribution in latent space. The unbounded projection into such a distribution would include materials that are not realistic materials. To avoid such unrealistic materials, the process can be started by finding the projected latent vector for the original material. From then on, the process can proceed in the space of the projected latent vector because the process is now constructed such that any latent vector leads to a realistic material. The computing device is thus constrained to stay in a space of realistic materials.

Continuing with FIG. 5, at block 510, a determination is made as to whether multiple target images will be used. For example, the computing device can access two target images by retrieving an additional target image 112 from memory device 106 as shown in FIG. 1. Any number of target images can be used. If multiple targets are to be used, the computing device resamples at block 512 to produce a uniform number of samples for each target image and computes a Wasserstein loss using the uniform number of samples. For example, the sliced Wasserstein loss as discussed with respect to FIG. 4 can be computed between deep features on labeled regions. Deep features $p^l$ and $\hat{p}^l$ from layer l on the rendered image $R(\theta)$ and one of the material targets $\hat{I}$ can be extracted. N directions $V \in S^{N_l}$ can be sampled and features $p^l$ and $\hat{p}^l$ can be projected onto the sampled directions to obtain projected one-dimensional features $p_V^l$ and $\hat{p}_V^l$.

At block 514, the computing device extracts one or more feature descriptions using a pre-trained VGG network. If materials from multiple target images are being applied, the sliced Wasserstein loss can be used to compare multiple target images by projecting per pixel VGG network features onto randomly sampled directions in feature space, giving multiple sets of one-dimensional, corresponding sample points, one for each target image. If a transfer rule such as Label i: Target $\hat{I}$, j is used, the transfer materials from regions labeled by j are transferred in $\hat{I}$ to regions labeled by I in the rendered image $R(\theta)$. In such a case, samples labeled from i to $p_V^l\{i\}$ and $\hat{p}_V^l\{j\}$ are taken. Since $p_V^l\{i\}$ and $\hat{p}_V^l\{j\}$ will usually contain different numbers of samples, the sliced Wasserstein loss in this example is computed using the resampling technique discussed with respect to FIG. 4. This loss is computed for each transfer rule separately and the average is used as the final loss value.

Still referring to FIG. 5, at block 516, the style loss is defined. Sliced Wasserstein loss can be used. Optimization is carried out at block 518. The functions included in block 514 through block 518 and discussed with respect to FIG. 5 can be used in implementing a step for producing an optimized value for the projected latent vector based on the material generation prior. In this example, optimization is accomplished by minimizing the value of a loss function of the feature description loss and the style loss as described above, using the same number of samples in each direction for all target images. The minimum value of the loss function defines the point at which the projected latent vector is at its optimal value. A Gram matrix can be used to calculate any statistical loss, including both of the losses described here. However, using the sliced Wasserstein loss and the VGG network for the feature description loss can more accurately account for statistical difference. A scene with one or more textures defined by one or more output material maps can be rendered by the computing device at block 520. As an example, rendered scene 132 is provided using output interface module 130 to presentation device 108.

In one test implementation, 1000 iterations were run on an Adam optimizer with a learning rate of 0.08, for latent vector projection. To evaluate the feature description loss, deep features were extracted using a VGG19 neural network to evaluate equation 2. Since projection details can be difficult to discern from a normal map, a higher weight can be assigned to the normal map's loss. After projection, the embedded latent code θ was optimized to minimize the loss function in equation 3. Similar to style transfer, deep features can be used to compute feature loss, and these features can be extracted from layers of the VGG network to compute the sliced Wasserstein loss. Style losses from different layers of the network can be weighted to emphases local features. To compute the Wasserstein loss, samples of a number of random projections equal to the number of channels of the compared deep features can be used. Such a computation was accomplished with 500 iterations using an Adam optimizer, with a learning rate of 0.02. For spatial control, an erosion operation as described below was performed on the subsampled label maps with a kernel size of five.

In these examples, a particular case of boundary features must be dealt with in evaluating the loss function, as network neurons on a labeled boundary of a texture will have a receptive field, which crosses the boundary due to the footprint of the deep convolutions, forcing the process to handle statistics from irrelevant nearby regions. To prevent transferring unrelated material statistics, an erosion operation can be performed on the labeled regions, so that the sliced Wasserstein loss is only evaluated on the eroded regions. An erosion operator takes two pieces of data as inputs. The first defined the image which is to be eroded. The second is a (usually small) set of coordinate points known as a structuring element or kernel. The structuring element determines the effect of the erosion on the input image. While an erosion operation reduces irrelevant texture transfer, too large an erosion may remove all samples from the distribution at deeper network layers. In order to avoid this, the loss for deeper layers with no valid pixels can be left out of computations.

Figure 6:
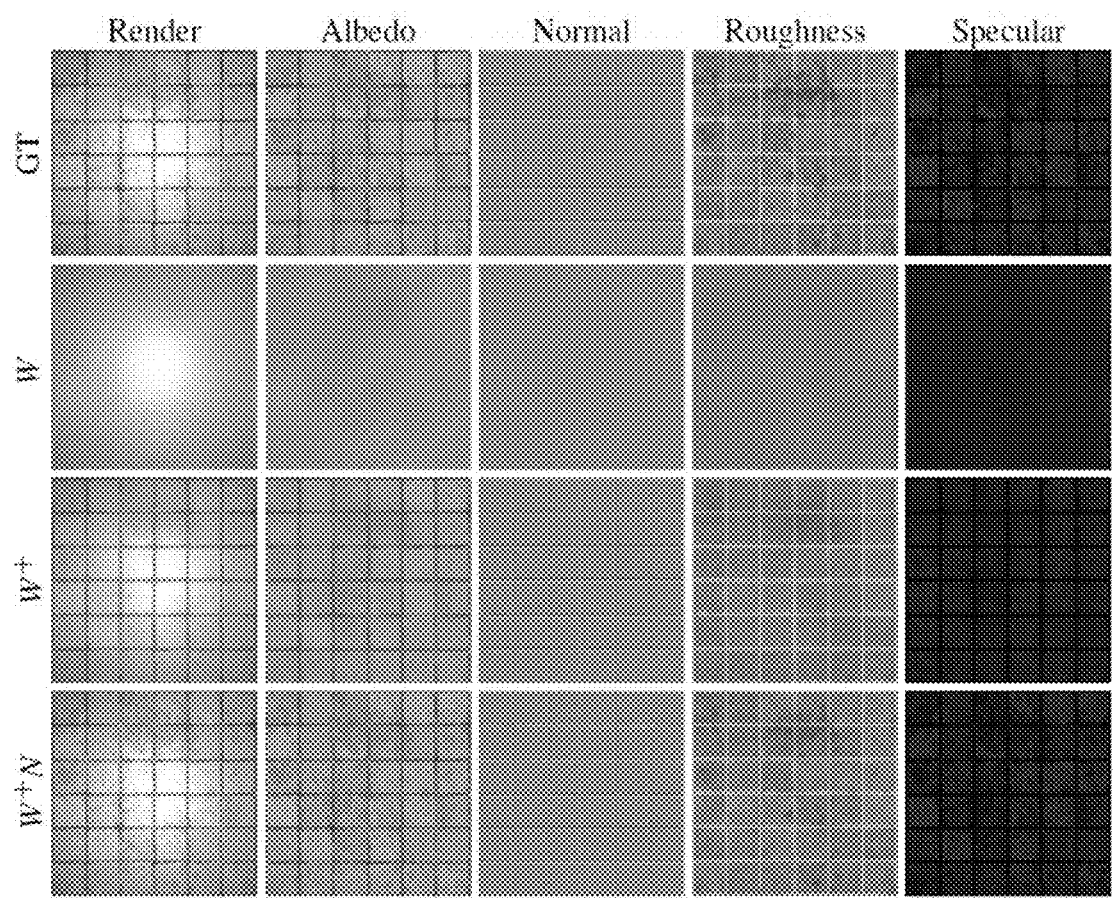
FIG. 6 is an example of projection results when optimizing to minimize statistical differences and determine a renderable image using target-augmented material maps, according to some embodiments.

FIG. 6 is an example 600 of projection results when optimizing to minimize statistical differences and determine a renderable image using target-augmented material maps, according to some embodiments. Example 600 shows projection results obtained only by optimizing W or W+ as discussed above with respect to equation 2. Results show that optimizing W is less computationally expressive. Optimizing W+ can capture large scale structures but misses fine scale structures.

To produce example 600, a tileable MaterialGAN model was trained using a synthetic material dataset containing 199,068 images with a resolution of 288×288. The material maps are encoded as nine-channel two-dimensional images (three for albedo, two for normal, one for roughness and three for specular). For this example, the full model is trained by crops; the generator synthesizes 512×512 material maps and a 2×2 tile (1024×1024). The tiles are randomly cropped to 256×256 to compare with randomly cropped 256×256 ground truth material maps. The architecture of the GAN can ensure tileability, despite the crops not being tileable. For important hyperparameters, γ=10 is set for R1 regularization and weight of path length regularization can be set to one. The network in this example is trained using an Adam optimizer (β=(0.9, 0.999)) with a learning rate of 0.002 on eight GPUs. Also, for this example, optimization uses a pre-trained tileable MaterialGAN model as a material prior. The MaterialGAN has multiple latent spaces: $z \in Z$, the input latent code; $w \in W$, the intermediate code after linear mapping; per-layer style code $w^+ \in W^+$; and noise inputs for blocks $n \in N$. For the bottom row of example 600, both W+ and N are optimized, enabling the optimization to capture both large-scale structure and fine-scale details.

FIGS. 7-10 are groups of images showing various stages of using a target photograph of a texture for material transfer to render a portion of a scene using a target-augmented material map. In each case, the target and the input images are shown along the top row and the transferred images are shown along the bottom row, with a final 2×2 tiled image shown on the right, all labeled. Each group of images shows single-target image transferred results including material maps and tiled renders. Realistic details are faithfully transferred from real photographs to material maps using the material prior provided by the modified MaterialGAN, preserving the tileability of input materials.

Figure 7:
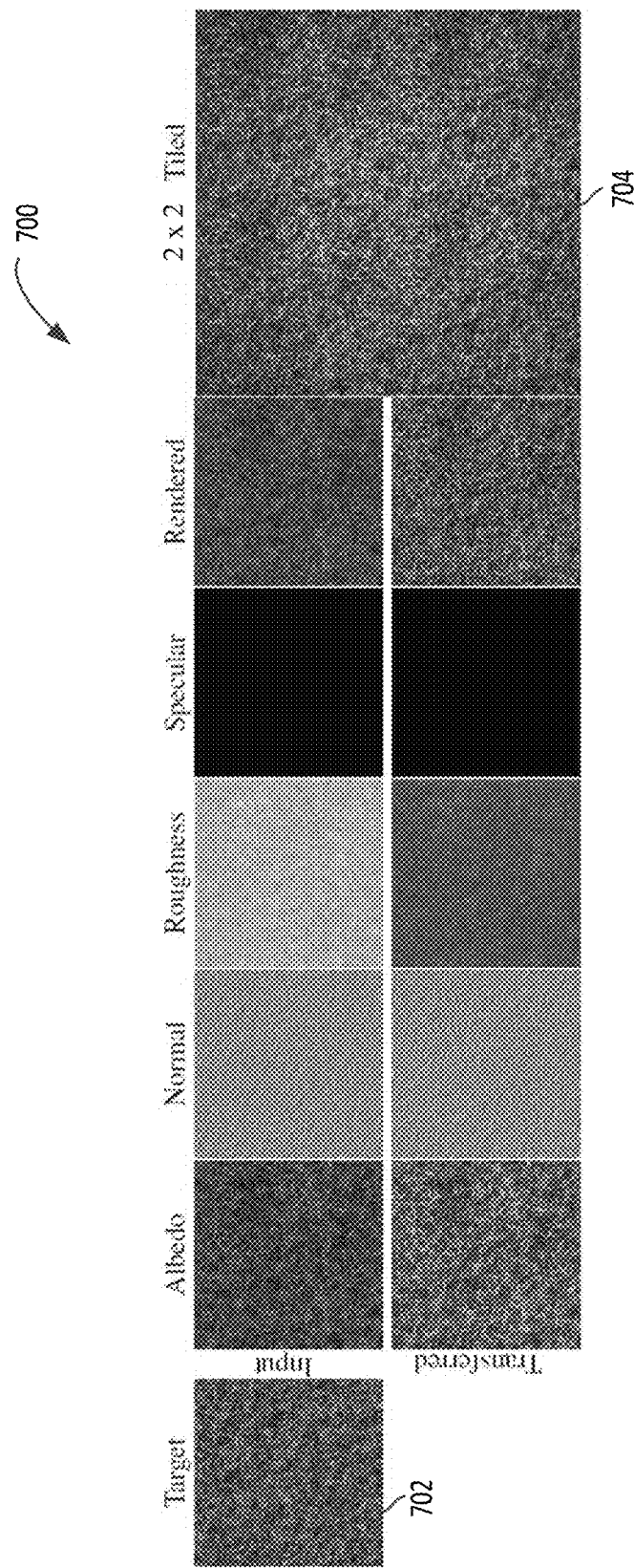
FIG. 7 is a group of example images showing various stages of using a target photograph of a texture for material transfer to render a material using a target-augmented material map.
Figure 8:
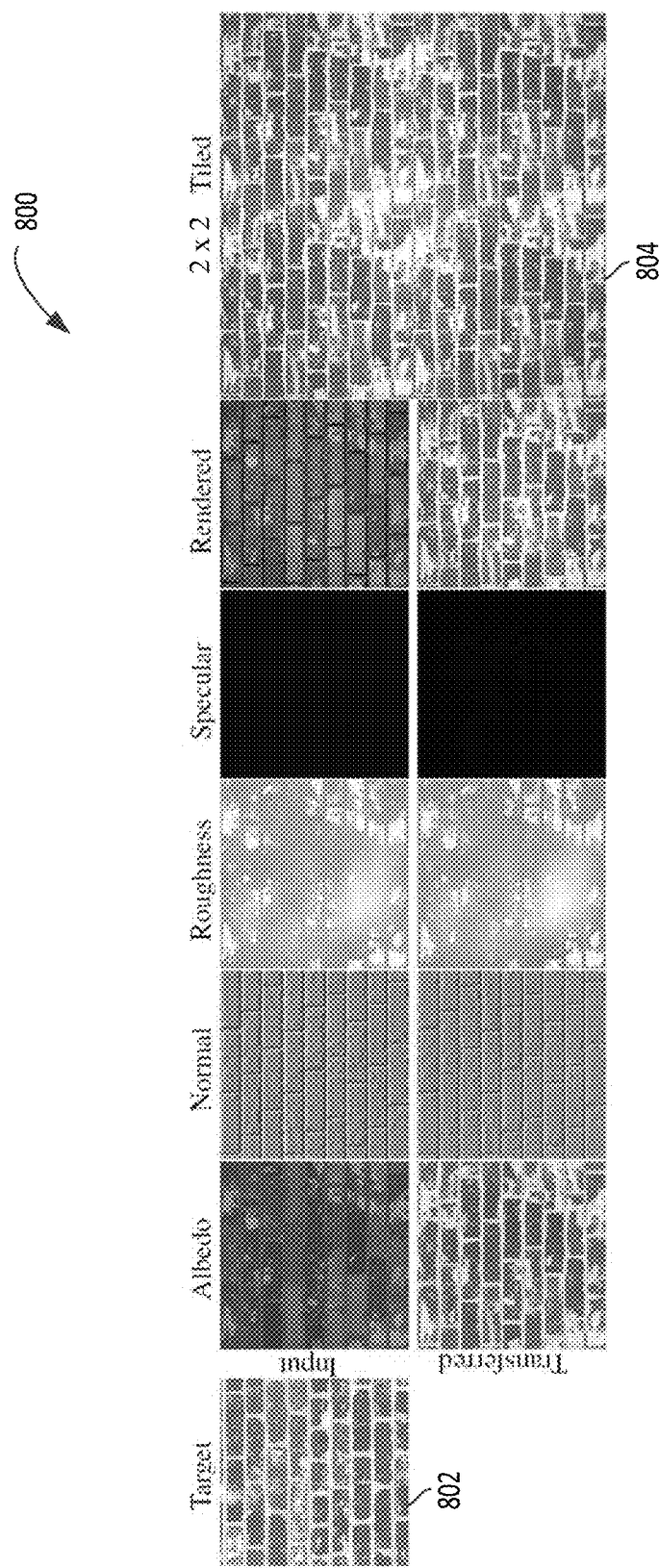
FIG. 8 is another group of example images showing various stages of using another photograph of a texture for material transfer to render a material using a target-augmented material map.
Figure 9:
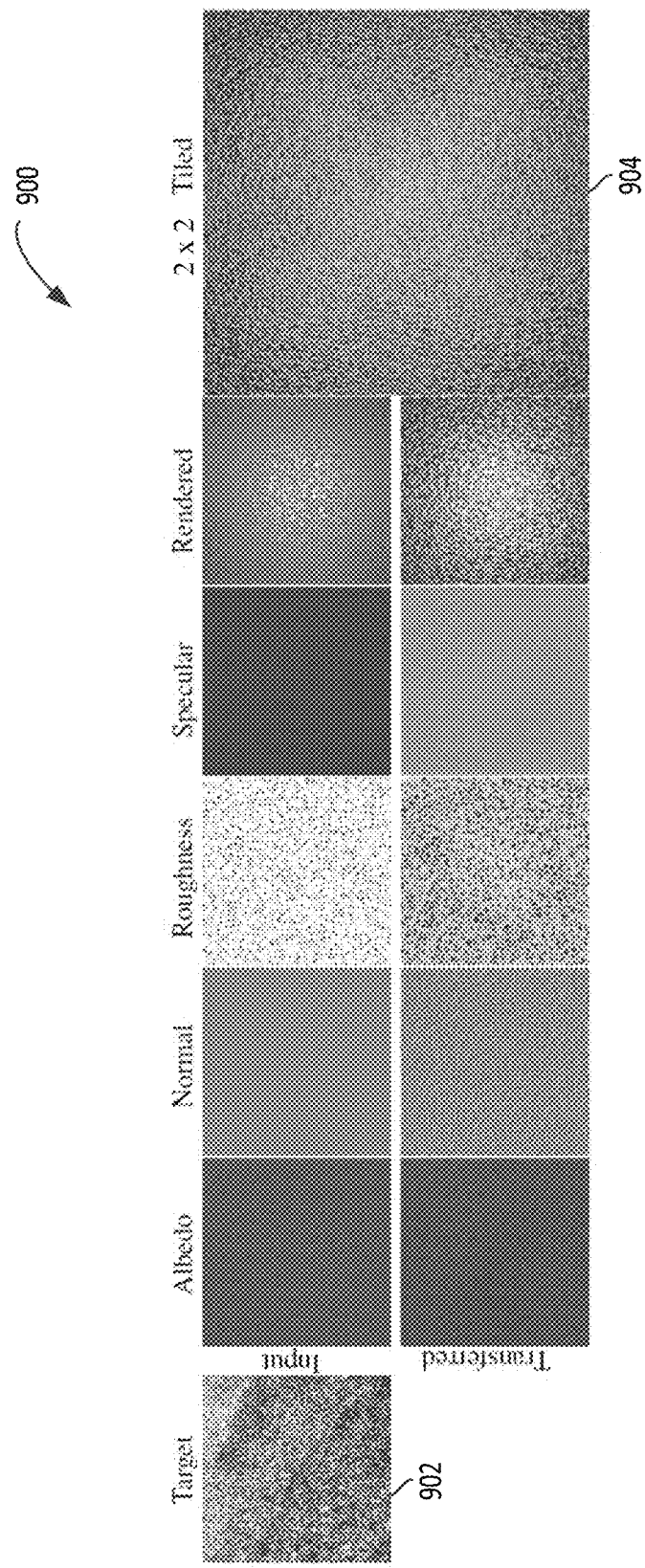
FIG. 9 is an additional group of example images showing various stages of using a different photograph of a texture for material transfer to render a material using a target-augmented material map.
Figure 10:
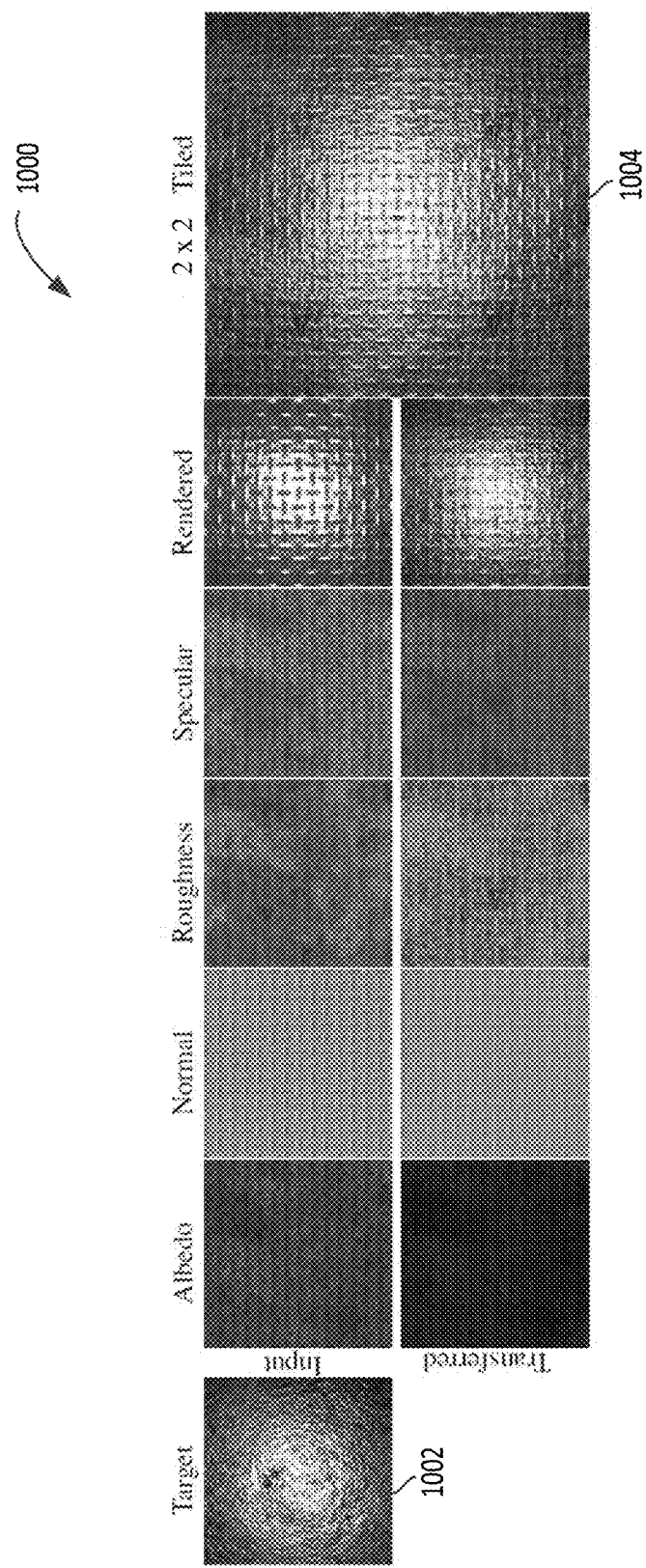
FIG. 10 is a further group of example images showing various stages of using another photograph of a texture for material transfer to render a material using a target-augmented material map.

Each image in FIGS. 7-10 shows the albedo, normal, roughness and specular images, along with a rendered image and a 2×2 tiled image. FIG. 7 shows group 700 of images including a target image 702 being used to obtain the tiled image 704. FIG. 8 is another group 800 of example images including a target image 802 being used to obtain the tiled image 804. FIG. 9 is an additional group 900 of example images including a target image 902 being used to obtain the tiled image 904. FIG. 10 is a further group 1000 of example images including a target image 1002 being used to obtain the tiled image 1004.

The augmentation of existing material maps based on input photos can be useful with procedural materials, which can be difficult to design realistically. The gap between an unrealistic procedural material and a realistic photo can be bridged to serve as a complementary process in inverse procedural material modeling. Examples in this disclosure ensure tileability after optimization, so that the transferred material maps can be applied smoothly. However, non-photographic targets can also be used as target images.

Figure 11:
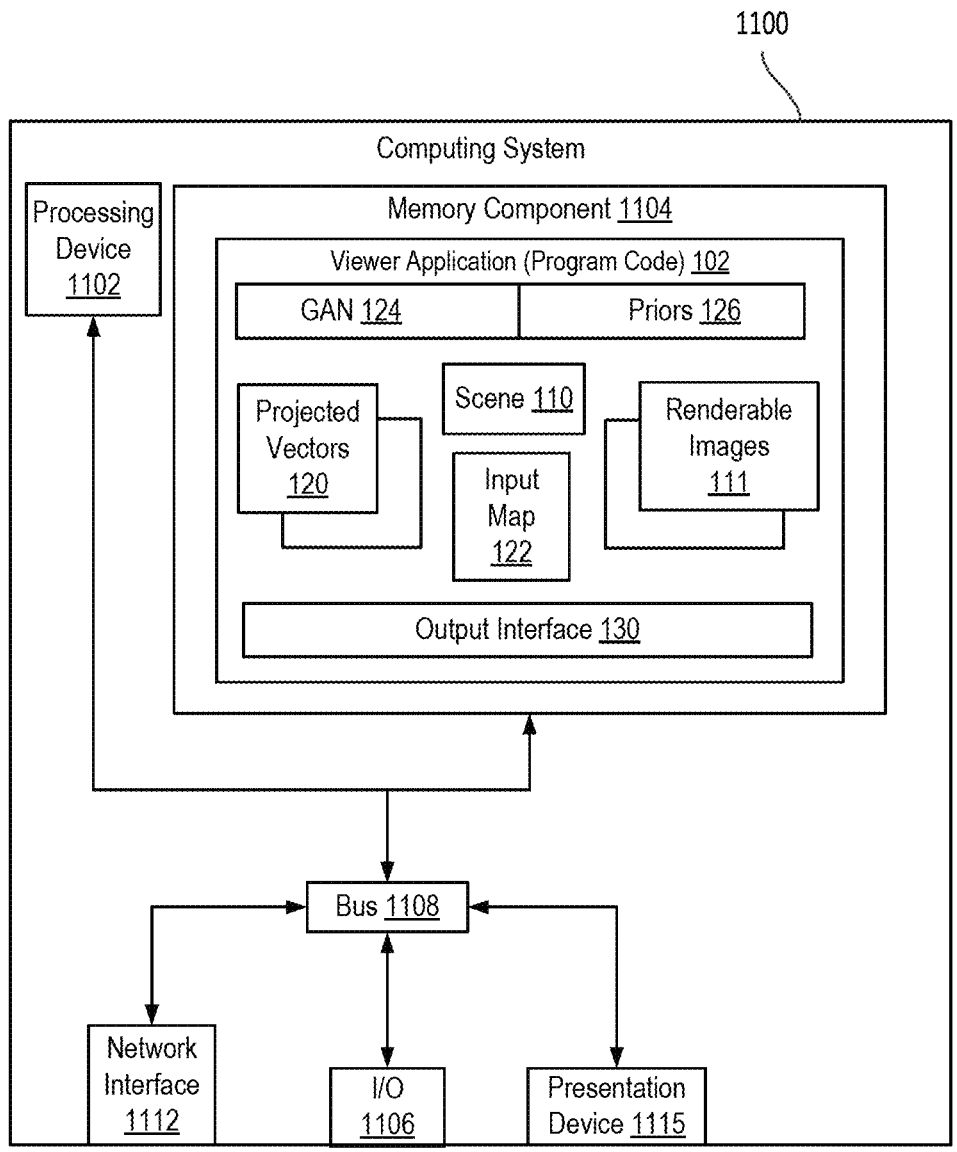
FIG. 11 is a diagram of an example of a computing system that can render images using target-augmented material maps, according to certain embodiments.

FIG. 11 is a diagram of an example of a computing system that can render images using target-augmented material maps, according to certain embodiments. System 1100 includes a processing device 1102 communicatively coupled to one or more memory devices. The processing device 1102 executes computer-executable program code stored in the memory component 1104. Examples of the processing device 1102 include a microprocessor, an application-specific integrated circuit ("ASIC"), a field-programmable gate array ("FPGA"), or any other suitable processing device. The processing device 1102 can include any number of processing devices, including a single processing device. The memory component 1104 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

Still referring to FIG. 11, the computing system 1100 may also include a number of external or internal devices, for example, input or output devices. For example, the computing system 1100 is shown with one or more input/output ("I/O") interfaces 1106. An I/O interface 1106 can receive input from input devices or provide output to output devices (not shown). Output may be provided using the output interface module 130 of the graphics imaging application 102. One or more buses 1108 are also included in the computing system 1100. The bus 1108 communicatively couples one or more components of a respective one of the computing system 1100. The processing device 1102 executes program code that configures the computing system 1100 to perform one or more of the operations described herein. The program code includes, for example, graphics imaging application 102 or other suitable applications that perform one or more operations described herein. The program code may be resident in the memory component 1104 or any suitable computer-readable medium and may be executed by the processing device 1102 or any other suitable processor. Memory component 1104, during operation of the computing system, can store the input scene 110, the GAN 124, and a prior 126 produced using the GAN. Memory component 1104 is also used to temporarily store an input map 122, which may correspond to scene 110.

The system 1100 of FIG. 11 also includes a network interface device 1112. The network interface device 1112 includes any device or group of devices suitable for establishing a wired or wireless data connection to one or more data networks. Non-limiting examples of the network interface device 1112 include an Ethernet network adapter, a wireless network adapter, and/or the like. The system 1100 is able to communicate with one or more other computing devices (e.g., another computing device executing other software, not shown) via a data network (not shown) using the network interface device 1112. Network interface device 1112 can also be used to communicate with network or cloud storage used as a repository for stored target images for use with the graphics imaging application 102. Such network or cloud storage can also include updated or archived versions of the graphics imaging application for distribution and installation.

Staying with FIG. 11, in some embodiments, the computing system 1100 also includes the presentation device 1115. A presentation device 1115 can include any device or group of devices suitable for providing visual, auditory, or other suitable sensory output. In examples, presentation device 1115 displays input and/or images. Non-limiting examples of the presentation device 1115 include a touchscreen, a monitor, a separate mobile computing device, etc. In some aspects, the presentation device 1115 can include a remote client-computing device that communicates with the computing system 1100 using one or more data networks. System 1100 may be implemented as a unitary computing device, for example, a notebook or mobile computer. Alternatively, as an example, the various devices included in system 1100 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "determining," and "identifying" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
accessing a scene, a target image including a target material appearance, and an input material map defining a coarse structure of the scene;
accessing a material generation prior produced using a generative adversarial network (GAN), wherein the material generation prior includes a statistical function;
encoding, based on the material generation prior and using the GAN, an input material appearance from the input material map to produce a projected latent vector;
optimizing a current value of the projected latent vector based on the material generation prior to minimize a statistical difference between the target image and a renderable image associated with the current value of the projected latent vector; and
rendering, responsive to the optimizing, the scene based on a final value of the projected latent vector and an output material map providing the target material appearance applied to the coarse structure of the scene.

2. The method of claim 1, wherein optimizing the current value of the projected latent vector further comprises minimizing, using an embedded latent code, a loss function including a style loss and a feature description loss.

3. The method of claim 2, further comprising extracting a feature description using a pre-trained VGG network to obtain the feature description loss.

4. The method of claim 2, wherein the style loss is defined using sliced Wasserstein loss.

5. The method of claim 2, wherein the target image comprises at least two target images, wherein minimizing the loss function further comprises:
resampling the at least two target images to produce a uniform number of samples across the at least two target images; and
computing a Wasserstein loss using the uniform number of samples.

6. The method of claim 1, further comprising training the GAN with a dataset of synthetic material maps, wherein the training of the GAN is separate from the optimizing of the current value of the projected latent vector.

7. The method of claim 1, wherein the target material appearance comprises at least one of color or shading.

8. A system comprising:
a memory component; and
a processing device coupled to the memory component, the processing device to perform operations comprising:
encoding, based on a material generation prior from a generative adversarial network (GAN), an input material appearance from an input material map to produce a projected latent vector, the input material map defining a coarse structure of a scene, and the material generation prior including a statistical function;
optimizing a current value for the projected latent vector based on the material generation prior to minimize a statistical difference between a target image including a target material appearance and a renderable image associated with the current value of the projected latent vector; and
storing or rendering, responsive to the optimizing, the scene based on a final value of the projected latent vector and an output material map augmented by the target material appearance applied to the coarse structure of the scene.

9. The system of claim 8, wherein optimizing the current value of the projected latent vector further comprises minimizing, using an embedded latent code, a loss function including a style loss and a feature description loss.

10. The system of claim 9, the processing device further performing an operation of extracting a feature description using a pre-trained VGG network to obtain the feature description loss.

11. The system of claim 9, wherein the style loss is defined using sliced Wasserstein loss.

12. The system of claim 9, the processing device further performing an operation of accessing a plurality of target images, wherein minimizing the loss function further comprises:
resampling at least some of the plurality of target images to produce a uniform number of samples across the plurality of target images; and
computing a Wasserstein loss using the uniform number of samples.

13. The system of claim 8, the processing device further performing an operation of training the GAN with a dataset of synthetic material maps, wherein the GAN is trained prior to the optimizing of the current value of the projected latent vector.

14. The system of claim 8, wherein the target material appearance comprises at least one of color or shading.

15. A non-transitory computer-readable medium storing executable instructions, which when executed by a processing device, cause the processing device to perform operations comprising:
accessing a scene, a target image including a target material appearance, and an input material map defining a coarse structure of the scene;
encoding, based on a material generation prior produced by a generative adversarial network (GAN), an input material appearance from the input material map to produce a projected latent vector, wherein the material generation prior includes a statistical function;
a step for producing an optimized value for the projected latent vector based on the material generation prior; and
rendering the scene based on the optimized value for the projected latent vector and an output material map augmented by the target material appearance applied to the coarse structure of the scene.

16. The non-transitory computer-readable medium of claim 15,
wherein the step for producing the optimized value for the projected latent vector further comprises minimizing, using an embedded latent code, a loss function including a style loss and a feature description loss.

17. The non-transitory computer-readable medium of claim 16, the executable instructions further causing the processing device to perform an operation of extracting a feature description using a pre-trained VGG network to obtain the feature description loss.

18. The non-transitory computer-readable medium of claim 16, wherein the style loss is defined using sliced Wasserstein loss.

19. The non-transitory computer-readable medium of claim 16, wherein the target image comprises a plurality of target images, wherein minimizing the loss function further comprises a step of computing a Wasserstein loss based on the plurality of target images.

20. The non-transitory computer-readable medium of claim 16, wherein the step for producing the optimized value for the projected latent vector comprises an iterative process, and wherein each iteration of the iterative process involves:
- determining a current value for the projected latent vector;
- generating an intermediate material map based on the current value for the projected latent vector;
- determining a statistical difference between the target image and a renderable image corresponding to the intermediate material map; and
- adjusting the current value for the projected latent vector based on the statistical difference.

* * * * *